United States Patent [19]
Baumann et al.

[11] Patent Number: 5,176,483
[45] Date of Patent: Jan. 5, 1993

[54] DETACHMENT LOCK FOR A BOLT CONNECTION

[75] Inventors: Dieter Baumann; Christian Boehnke, both of Greven-Gimbte, Fed. Rep. of Germany

[73] Assignee: Inq. Walter Hengst GmbH & Co., Fed. Rep. of Germany

[21] Appl. No.: 712,472

[22] Filed: Jun. 10, 1991

[30] Foreign Application Priority Data

Jan. 21, 1991 [DE] Fed. Rep. of Germany ....... 4101576

[51] Int. Cl.⁵ .................... F16B 39/30; F16B 39/284
[52] U.S. Cl. .................... 411/310; 411/324; 411/938; 411/947
[58] Field of Search .............. 411/263, 272, 277, 278, 411/281, 301, 310, 311, 324, 332, 333, 392, 907, 908, 937.1, 938

[56] References Cited

U.S. PATENT DOCUMENTS

| | | | |
|---|---|---|---|
| 3,027,042 | 3/1962 | Graves | 411/938 |
| 3,238,985 | 3/1966 | Reid et al. | 411/938 |
| 3,972,359 | 8/1976 | Thomas | 411/938 |
| 3,972,361 | 8/1976 | Ollis, Jr. | 411/938 |
| 4,175,605 | 11/1979 | Johnson | 411/311 |
| 4,273,175 | 6/1981 | Capuano | 411/310 |

Primary Examiner—Neill R. Wilson
Attorney, Agent, or Firm—Hill, Van Santen, Steadman & Simpson

[57] ABSTRACT

A threaded connection structure for rotatably connecting and disconnecting adjoining members including a female member having annular internal pitched threads and a male member for threading into the female member having outer threads complemental to the threads of the female member with raised areas along the axial faces of the threads of one of said members to cause areas of concentration of unit pressure between the threads so that unwanted rotation and unwanted unthreading is prevented. A flange is provided on one member to engage a shoulder on the other member for continued axial surface pressure of the raised areas.

11 Claims, 1 Drawing Sheet

DETACHMENT LOCK FOR A BOLT CONNECTION

BACKGROUND OF THE INVENTION

The invention relates to improvements in means for preventing unwanted rotation and loosening between rotatably threaded members.

In interconnection between threaded members such as between nuts and bolts, many uses subject the members to mechanical shocks and vibrations as well as thermal cycling and fluctuating stresses. This is common in construction elements in machine connections and in many nut and bolt connections between operating parts. The unwanted unthreading or loosening of the connection between the nuts and bolts is undesirable in many environments and will lead to grave consequences. Efforts have been heretofore made to prevent unthreading between nut and bolt parts due to vibration or stresses of the type described and these are prevented by rotation preventing means such as spring lock washers, studded disks, safety pins or safety cotter pins.

All of the locking devices heretofore available are provided as separate attachment or separate pieces. This creates a disadvantage in handling and assembling and the parts can easily be lost during assembly and dismantling. Also, in the case of bolt connections with larger thread diameters such as utilized in casings with lids or covers, the locking devices are unwieldy. A detachment preventing lock such as heretofore used in the prior art is disclosed in DE-PS 37 05 951 wherein the structure disclosed produces a force acting between the construction elements screwed together in the homing direction by means of a taut spring. Such a detachment lock is disadvantageous in that it does not have general applicability. Furthermore, it is costly to manufacture and requires a relatively large mounting and operational space.

FEATURES OF THE INVENTION

An object of the invention is to provide a detachment preventing lock for threaded rotatable interconnecting parts which avoids the disadvantages of structures heretofore available and which is integral with the mating threaded parts.

A further object of the invention is to provide a detachment preventing lock for coacting threaded parts which is particularly simple to manufacture and requires no separate parts and calls for no extra mounting and operational space.

A still further object of the invention is to provide a rotation preventing device for mating threaded parts wherein the device is integral with the parts and is more easily manufactured and handled than structures heretofore available.

In accordance with the features of the invention, it becomes possible for two threaded parts to be screwed together where they no longer lie against each other along their complete length or threaded surface but rather only a part of this threaded surface. This provides an increased surface pressure at the remaining thread surface where interengagement exists and in the area where both the threads lie against each other. In utilizing the concept of increased surface pressure between the threads, despite the fact that the structure is simple in construction, an extremely effective detachment lock is provided capable of resisting heavy mechanical vibrations or stresses caused by pressure impulses or temperature fluctuations. These occur, for example, in the oil or air filter casings of vehicles and in many other parts subject to environmental conditions which tend to cause relative rotation and disengagement between the threaded parts.

In a preferred embodiment as illustrated in the drawings, the threads are shaped with staggered raised portions which provide for a concentration of pressure in the area where the raised portions exist. The raised portions can be in the forms of steps such as in a zigzag or wave form. Such shapes are relatively simple to manufacture but insure predefined relationships with regard to the size of the remaining surfaces of the threads screwed together that lie in contact with each other.

Dependent upon the materials employed in the manufacture of the parts which are to be screwed together, a larger or smaller staggered section of the thread can be utilized in order to achieve the required degree of locking. In a preferred arrangement, the amount of the staggered section of the axial course of the screw lies between 1% and 10% of the thread pitch. Where a rigid material such as metal is used, there can be a smaller amount of the raised or staggered section and in the case where a more elastic or flexible material such as plastic is used, a larger amount of the staggered or raised section is preferable.

A further possibility for influencing the degree of efficiency of the detachment lock consists in allowing the staggered section to extend itself over differently large angular ranges of the plane of the circumference of the screw thread. The staggered or raised portions can extend preferably over angular ranges of the circumference of between 5° and 45°. The smaller the angular range, the greater the resulting surface pressure and thus the locking efficiency. On the other hand, the specific degree of surface pressure is greater whereby the optimal compromise between the two requirements will be utilized by those skilled in the art in accordance with the requirements of the environment.

In order to strengthen the efficiency of the safety lock with regard to any undesirable loosening of the threaded connection, a further feature of the invention requires the construction of the screw thread with asymmetrical thread flanks. In each case one flank, as viewed radially with respect to the screw thread, runs vertically or parallel to the axial dimension of the screw and displays thread areas with the staggered section, whereby when screwed together, the two screw threads only lie against each other in the area of the raised portion. Such a design of the thread means that a radial movement of the parts screwed together which can be caused by a change in temperature or pressure has no effect on the strength of the threaded connection.

It is furthermore intended that the maximal interior diameter of the female thread in comparison with the maximal external diameter of the male thread features an interference which makes possible an expansive compensation. By means of this provision, an unforced compensation is possible and screwing in and out, except for the final tightening and the first loosening of the secured bolt, is possible and can be achieved without tools.

The features of the invention can be applied particularly advantageously in the case of bolt connections between parts comprised of different materials. One preferred material combination consists of casings of metal with a plastic lid and thread areas with a staggered section are employed in the thread attached to the casing. It is appropriate that the thread which is part of the metallic construction unit is formed with the areas of the staggered section and the thread of the plastic construction unit is advantageously in a position to receive an elastic flexible deformation of its thread pitch. That is, the plastic part expands at least in part into the unstaggered thread areas in the axial direction which thread areas lie between the areas of the staggered or raised sections thus increasing the locking strength.

The invention also suggests that the thread which has the staggered or raised sections be manufactured by means of a metal cutting manufacturing process and/or injection molding. Such a thread can thus be manufactured quickly and simply and requires no additional stages of processing and no further time.

Other objects, advantages and features of the invention will become more apparent with the teaching of the principles thereof in connection with the disclosure of the specification and claims and drawings, in which:

DESCRIPTION OF THE PREFERRED EMBODIMENTS

Figure 1:
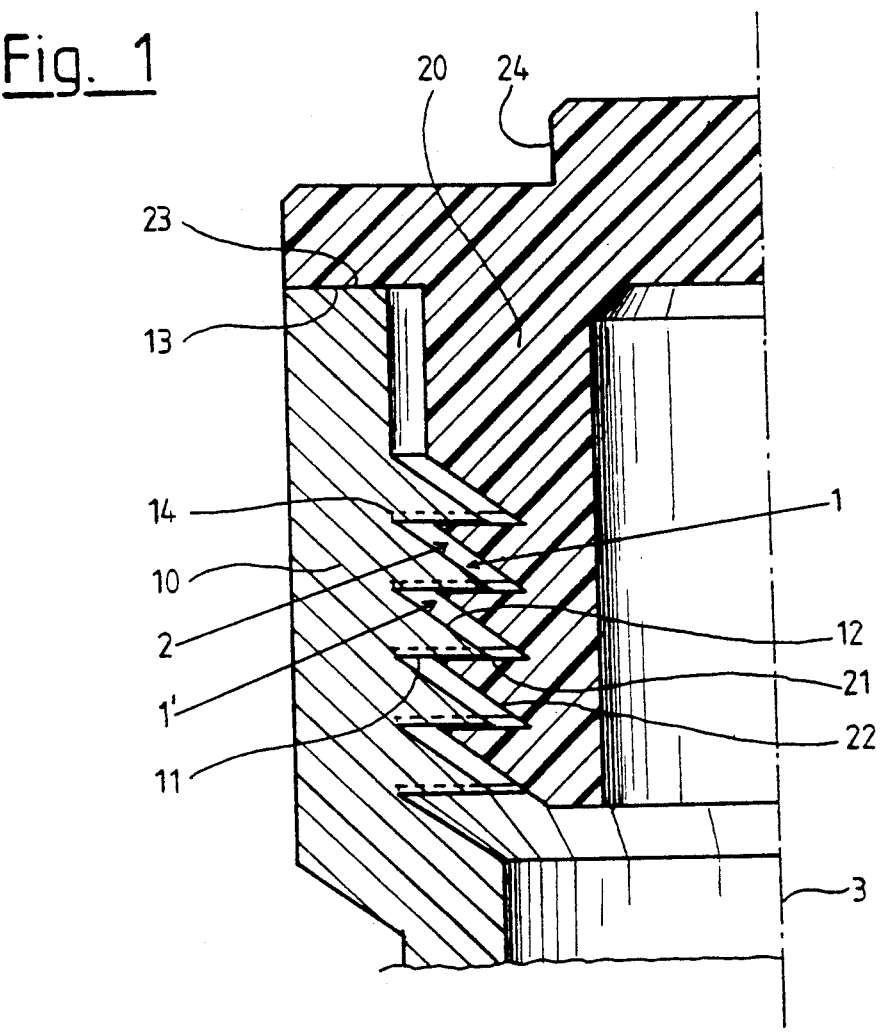
FIG. 1 is a fragmentary sectional view taken along a section through the axis of rotary threaded members.

As illustrated in FIG. 1 of the drawing, there is an outer female member or casing 10. This female member or casing is closed at its upper opening with a male member or lid 20. The members are joined with interconnecting mating pitched threads 1 and 2.

Thread 1, which is on the casing, is annularly arranged on the inwardly facing surface of the casing and forms a female thread. Thread 2 of the lid 20 is annular and interengages with the thread 1.

As illustrated in FIG. 1, the male member or lid is threaded fully into the female member and is provided with a flange 23 which extends outwardly. The flange lies against an axially facing shoulder or face 13 of the casing 10. When the two parts are threaded tightly together, the flange 23 pressing against the shoulder 13 draws the parts tightly together maintaining an axial tension therebetween and this axial tension causes projections between the threads to dig in or cause surface stress concentration to lock the parts against inadvertent rotation and disconnection.

On the upper surface of the lid 20, the lid has a projection 24 for a tool such as a wrench. For simplicity only half of the sectional structure is shown and the remaining right half is symmetrical to the left half except for the pitch of the threads 1 and 2.

It is essential for the threaded connection which is shown that one of the two threads 1 and 2 has a staggered or raised area 14. That is, the raised areas 14 are staggered around the circumference of the threads. The raised thread area is shown at 1' and the raised areas in this instance are shown on the female casing part 10 so that they dig into the upwardly facing surfaces of the threads 2 of the male part.

The raised area can be on either of the threads of the female part or the male part but must face axially in a direction so that when the two parts are screwed together tight, the raised or staggered portions will dig into the mating smoother faces of the other part.

Within the area 1', which has the staggered section, the position of the downwardly pointing thread surface 11 of the thread 1 in the casing 10 deviates downwardly from the normal position as shown by means of broken lines. The height of the staggered section 14 in the axial dimension of the male member 3 consists of between 1% and 10% of the pitch of the thread. From the perspective of the circumference of the thread 1, the areas 1' cover an angular area of between 5° and 45° to the staggered section 14. The number of areas 1' to the staggered section can vary with each turn of the thread. Preferably, this number lies between 3 and 12 areas 1' for each turn of the thread As illustrated in FIG. 1, the two threads 1 and 2 are formed with asymmetrical thread flanks 11, 12 and 21, 22. Seen from a radial perspective, flanks 11 and 21 run essentially on a plane normal to the axis of the bolt 3. The other flanks 12 and 22 are formed angularly. Furthermore, it is evident from FIG. 1 of the drawing that the maximal inner diameter of the thread 1 in the casing 10 is larger than the maximal exterior diameter of the thread 2 in the lid 20. This difference in size is shown in an exaggerated fashion in the drawing. By means of the structural design, an expansive compensation without problems and without influence on the locking devices is possible. An expansion or contraction of the lid 20 can occur as a result of the pressure temperature changes or by absorption or release of liquids in the case of plastic employed for the lid 20. The casing is illustrated as being of metal.

Figure 2:
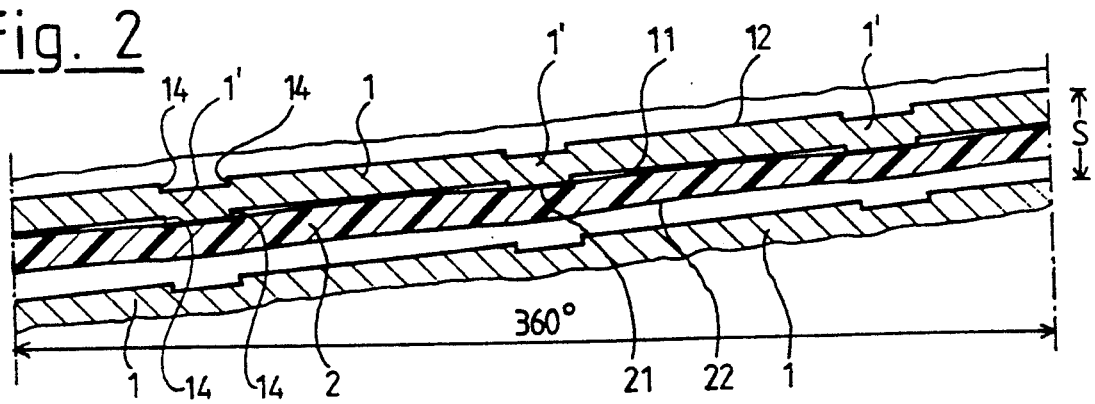
FIG. 2 is a somewhat exploded view showing the threaded connection of FIG. 1 in an unwound arrangement laying out 360° of the circumference in a plan view.

The functioning together of the threads 1 and 2 is evident in the unwound illustrated showing a 360° layout of the threads 1 and 2 in FIG. 2. Thread 1 belongs to the casing 10 which in this case is manufactured of metal and the raised areas are at regular spacings shown at 1'. the raised sections are in an axially downward direction staggered section 14. As can also be seen i FIG. 2, the thread 2, which belongs to the lid 20 is made of plastic and contacts with its upper flank 21 only in the areas 1' with its staggered section of the thread 1 on its lower flank 11. In this manner, an especially high surface pressure is achieved at those contact areas which insure that the rotation preventing detachment lock exists. As the plastic is in addition elastic, the flexible thread 2 succeeds in the screwed up state in the areas of the thread 1 squeezing into the interstitial spaces which lie between the areas 1' is the staggered section 14 which provides a further safeguard against an unintentional loosening of the threaded sections. The shoulders at the edges of the raised sections are at 90° or rather sharp so that unwanted rotation with vibration or shaking of the parts cannot occur.

The staggered section 14 of the thread areas 1' is constructed step-shaped with almost right angularly shaped shoulders. Alternatively, the staggered section can be provided with oblique shoulders and can be shaped trapezoidal, zigzagged or wave-shaped.

Further as is illustrated in FIG. 2, the relationship of the contribution of the staggered section 14 to the pitch S that is shown on the right side of FIG. 2 contributes to the locking. In a horizontal dimension, the unwinding shown in FIG. 2 is exactly one revolution of the threads 1 and 2 which covers a circumferential angle of 360°.

The invention in principle is utilizable for screw and bolt connections of all kinds and is particularly advantageous in the field of casings and their lids which are subjected to heavy loads and which occur in vehicles.

Thus, it will be seen that there has been provided an improved rotation preventing lock which is integral with the structure, which does not weaken and become disadvantageous to the structure and which achieves the objectives and advantages above set forth.

We claim as our invention:

1. A threaded connection structure for rotatably connecting and disconnecting adjoining members comprising in combination:
   an outer female member having annular inner internal pitched threads;
   an inner round male member having circular pitched threads complemental to the threads of the female member for being rotatably threaded into the female member with said threads of one member engaging the threads of the other member along axially facing thread surfaces;
   raised areas on axial face of the threads of one of the members causing a concentration of unit pressure at the location where the raised area engages a face of the thread of the other member so that unwanted rotation and unthreading is prevented;
   and wherein upon axial stress between the members the threads of the members are in engagement only in the area of said raised areas.

2. A threaded connection structure for rotatably connecting and disconnecting adjoining members constructed in accordance with claim 1:

3. A threaded connection structure for rotatably connecting and disconnecting adjoining members constructed in accordance with claim 1:
   wherein the raised area has an axial dimension between 1% and 10% of the thread pitch.

4. A threaded connection structure for rotatably connecting and disconnecting adjoining members constructed in accordance with claim 1:
   wherein the raised area extends circumferentially over an angular area of between 5° and 45°.

5. A threaded connection structure for rotatably connecting and disconnecting adjoining members constructed in accordance with claim 1:
   wherein one of said members is formed of metal and the other of said members of plastic and the raised areas are located on the metal threads.

6. A threaded connection structure for rotatably connecting and disconnecting adjoining members constructed in accordance with claim 1:
   wherein said raised areas are uniformly spaced over 360° of the threads.

7. A threaded connection structure for rotatably connecting and disconnecting adjoining members constructed in accordance with claim 1:
   wherein said raised areas have sharp edged shoulders at the ends.

8. A threaded connection structure for rotatably connecting and disconnecting adjoining members constructed in accordance with claim 1:
   including means between said male and female members causing axial stress between the members for continued force between said raised areas and the threads of the other member.

9. A threaded connection structure for rotatably connecting and disconnecting adjoining members constructed in accordance with claim 1:
   wherein one of said members has a radially extending shoulder for engagement with a surface of the other member with said members fully engaged to cause continual axial force between said members and continued engagement of the raised areas with the threads of the other member.

10. A threaded connection structure for rotatably connecting and disconnecting adjoining members constructed in accordance with claim 1:
    including an annular shoulder on the male member and an axial facing surface on the female member engageable by the shoulder to cause continual axial stress between said members and to cause continued engagement and increased unit surface pressure of the raised area with the threads of the other member.

11. A threaded connection structure for rotatably connecting and disconnecting adjoining members constructed in accordance with claim 1:
    wherein the number of raised areas for a circumference is between 3 and 12.

* * * * *

UNITED STATES PATENT AND TRADEMARK OFFICE
CERTIFICATE OF CORRECTION

PATENT NO. : 5,176,483

DATED : January 5, 1993

INVENTOR(S) : Dieter Baumann and Christian Boehnke

It is certified that error appears in the above-identified patent and that said Letters Patent is hereby corrected as shown below:

On the title page, item [73]: Assignee should read
--Ing. Walter Hengst GmbH & Co. KG--

Signed and Sealed this

Twenty-ninth Day of November, 1994

Attest:

BRUCE LEHMAN

*Attesting Officer*    *Commissioner of Patents and Trademarks*